United States Patent [19]

Simko, Jr.

[11] Patent Number: 4,846,151
[45] Date of Patent: Jul. 11, 1989

[54] SOLAR COLLECTORS

[76] Inventor: Frank A. Simko, Jr., 749 Tropical Cir., Sarasota, Fla. 34242

[21] Appl. No.: 918,643

[22] Filed: Oct. 10, 1986

Related U.S. Application Data

[63] Continuation-in-part of Ser. No. 729,264, May 1, 1985, abandoned, which is a continuation-in-part of Ser. No. 626,017, Jun. 29, 1984, abandoned.

[51] Int. Cl.$^4$ ................................................. F24J 2/04
[52] U.S. Cl. .................... 126/441; 126/450; 126/901; 126/447
[58] Field of Search ............... 126/441, 442, 449, 450, 126/417, 444, 901

[56] References Cited

U.S. PATENT DOCUMENTS

| | | | |
|---|---|---|---|
| 3,000,375 | 9/1961 | Golay | 126/450 |
| 3,981,293 | 9/1976 | Gillery | 126/441 |
| 4,018,211 | 4/1977 | Barr | 126/441 |
| 4,034,736 | 7/1977 | Telkes | 126/441 |
| 4,055,163 | 10/1977 | Costello et al. | 126/450 |
| 4,078,548 | 3/1978 | Kapany | 126/441 |
| 4,155,345 | 5/1979 | Madern | 126/439 |

FOREIGN PATENT DOCUMENTS 79976  6/1983  European Pat. Off. ............ 126/441

OTHER PUBLICATIONS

Hollands, "Honeycomb Devices in Flat-Plate Solar Collector," Solar Energy, vol. 9, No. 3, pp. 159–164 (1965).

Primary Examiner—James C. Yeung
Attorney, Agent, or Firm—Arnold Grant

[57] ABSTRACT

A solar energy collector comprising a solar energy absorber, a light transmitting top plate spaced apart from and in a plane parallel to the solar energy absorber, and an array of light transmitting cells intermediate to and in a plane perpendicular to the top plate and solar energy absorber. The collector may also include a light transmitting bottom plate intermediate the solar energy absorber and the array of cells. The bottom surface of the top plate or bottom plate, preferably the latter, is coated with a low emissivity coating. All surfaces of the top and bottom plates may also be coated with an anti-reflective material.

51 Claims, 3 Drawing Sheets

SOLAR COLLECTORS

RELATED APPLICATIONS

The present application is a continuation-in-part of application Ser. No. 729,264, filed May 1, 1985, abandoned which is, in turn, a continuation-in-part of application Ser. No. 626,017 filed June 29, 1984 abandoned.

BACKGROUND OF THE INVENTION

The present invention relates to solar collectors. More particularly, the present invention relates to a solar energy collector comprising an array of light transmitting cells positioned adjacent a solar energy absorber.

The solar energy absorber can take many forms. For example, it can be of a flat plate collector that heats fluids for residential or commercial use. Flat plate solar collectors usually comprise an optically black solar absorbing surface in conjunction with a series of fluid containing tubes and/or a fluid containing tank. The black solar absorbing surface converts the light from the sun into energy and then transmits that energy to the fluid, usually water, in the tubes or tank. The hot water can be used for cleaning; e.g., personal clothing and vehicles or, in some cases, for heating other bodies of fluid such as the water in a swimming pool or air in a room.

The solar energy absorber can also be all or part of an interior or exterior structure wall. In this approach the wall would be constructed from a material with a high heat capacity and low thermal conductivity. The wall can be constructed either with or without black, heat absorbing material on its surface. Light from the sun would be absorbed by the wall and converted into heat energy which would then be transmitted into the structure to heat the fluid; i.e., air, within the rooms of the structure. Alternatively, the sun's energy can be absorbed by a flowing wall or body of water or fluid containing phase change materials immediately adjacent the structure wall. By either of these means the resultant heat energy can be readily transported and delivered to any part of the structure. Similarly, the solar energy absorber can be the very contents of a room such as a green house; i.e., the solar energy absorber could be the plants and earth, etc. within the room.

Whatever form the solar energy absorber may take, it is inherently inefficient and is continually losing a significant portion of the absorbed energy by the well known mechanisms of convection, conduction and radiation. The interaction of these heat loss mechanisms limits both the amount of energy transmitted by the absorber to the adjacent fluid and the peak temperature attainable by that fluid. Moreover, as in any complex system, action to control one variable often has a detrimental effect on other variables.

For example, in the context of a flat plate solar collector, convection losses generated by surrounding environmental factors can be controlled to a limited extent by containing the solar absorber within a confined space such as a box. Typically, the solar absorber will form the bottom of the box with the sides being insulated and the top cover being constructed of glass, plastic or other materials which are transparent to solar radiation. The box prevents external air currents from interacting with the solar absorber. However, this "solution" to forced convection losses necessarily brings the solar absorber into intimate contact with other surfaces, gases and materials. This contact, in turn, permits conduction losses. Moreover, while the side walls and top cover of the box do reduce the effects of forced convection caused by externally generated air currents, they have no impact on natural convection and thermal instabilities within the box.

The most difficult energy loss mechanism to control has been radiation. The solar energy absorber is heated by radiant energy from the sun and can lose a significant portion of that energy by re-radiation to the atmosphere. The typical solution in flat plate solar collectors is to incorporate one or more infrared absorbing plates, that is a plate which will transmit in the visible spectrum, parallel to the solar absorber. For example, a glass or plastic cover used alone or in conjunction with other glass or plastic plates or films. Such plates will absorb the infrared energy radiated to it from the solar absorber. Some of this energy will be re-radiated outward and lost, but in the process the rate of heat loss is slowed substantially. The difficulty of the problem is compounded by the fact that the very absorbing materials which have a salutary effect on re-radiation losses also reduce the transmission of incident sunlight to the solar absorber.

Transmissivity of a solar collection system, defined as the ability of a system to transmit incident sunlight to the solar energy absorber, is a function of two principal variables: The materials of construction of the system and the number of surfaces between the solar energy absorber and the atmosphere. Each plate has two surfaces. The lowest transmission loss produced in a plate to date as a result of reflection is about 8 percent; i.e., and inherent loss of 4 percent per surface for a total transmissivity for the plate of 92 percent. If two plates of this material are used in a solar collection system, one plate to form the top cover of the box and one plate within the box to reduce radiation losses, the transmissivity of the system is $0.92 \times 0.92$ or 84.64 percent. Thus, even when the very best materials are used in the most sparing fashion possible, the inherent reduction in transmissivity is dramatic.

A partial solution to this problem is found in the work "Design Considerations for Solar Collectors with Cylindrical Glass Honeycombs" by Buchberg, et.al. reported in *Solar Energy*, Volume 18, Pages 193–203 and published by Pergamon Press, 1976. The flat plate solar collector shown therein has a glass cover and incorporates a hexagonal or square packed honeycomb array of cylindrical glass tubes in a plane perpendicular to the solar absorber plate. The honeycomb of tubes acts as a baffle to suppress the most damaging form of convection by confining the fluid motion to walled cells. In a tilted array, heated from the bottom, upward flowing hot air in the honeycomb is retarded by viscous shear on the cell walls and thermal energy in the air is drained by conduction to the cell walls. Lateral conduction through the cell walls and radiation exchange across the cells redistribute this energy to the colder regions and from there to the colder down flowing air. This, in turn, lessens the buoyancy difference between the relatively hotter and colder air. Viscous shear created by the cell walls also acts to slow the down flowing colder air.

Thermal radiation transfer from the hot solar absorber to the relatively cold cover glass is also reduced significantly by the presence of the cell walls. Emitted photons from the solar absorber which encounter the cell walls are absorbed strongly because of their infrared wavelengths. The re-radiation from the cell walls is directed both upwardly and downwardly. The downward directed infrared radiation reduces the net difference between the upward and downward infrared radiant fluxes at the solar absorber and thereby reduces the net infrared re-radiation loss.

The Buchberg, et.al. approach is, however, only a partial solution to the problems of convection, conduction and re-radiation losses in solar collectors. Even with very thin cell walls and length-to-diameter (L/D) ratio for the tubes in the optimum range, the R-value (the measure of the ability of the system to retain absorbed energy) for the Buchberg, et.al. collector is only about 1.60. While this does represent an improvement over thermal resistance of other prior systems, it does not approach the R-value of at least 2 required to generate steam or an R-value of at least 3 required before a solar collector can be used as the basis for an air conditioning system.

Moreover, Buchberg, et.al. is restricted to a honeycomb of closely packed hexagonal or square packed arrays wherein the tubes are in contact with each other over their full length. As Buchberg, et.al. indicates, the cost of the honeycomb, the solar energy reaching the absorber and the heat loss by conduction are all influenced by the amount of glass in the cross-section of the honeycomb; i.e., as the amount of glass in the cross-section increases, the energy transmitted to the absorber decreases and the heat loss due to conduction increases. All of these are negative effects both to the economy and the effectiveness of a solar collector.

SUMMARY OF THE PRESENT INVENTION

The present invention solves each of the foregoing problems and provides a solar collector which can have an R-value of at least in excess of 1.9 and, in preferred embodiments, even in excess of 4. As such, the energy generated by the collector can be delivered in many desirable forms and may be used in many heretofore unattainable applications.

In its most basic terms, the present invention is a solar energy collector comprising a solar energy absorber, a light transmitting top plate spaced apart from and in a plane parallel to the solar energy absorber, and an array of light transmitting cells intermediate to and in a plane substantially perpendicular to the top plate and solar energy absorber.

The cells may be cylinders, cones, truncated cones or combinations thereof. The cells may be open at one or both ends or closed at one or both ends. Conical cells present the smallest amount of reflecting surface to the incident sunlight which minimizes the reflectance loss in transmission of the sun's light and energy to the solar absorber. If cones and/or truncated cones are used, the large diameter is adjacent the top plate and the apex or smaller diameter is adjacent to the solar absorber. The cells may be in contact with each other or may be spaced apart. Preferably, the cells are spaced from each other.

The top plate is preferably coated with a low emissivity material; i.e., a material which permits the passage of most of the incident sunlight but reflects a significant amount of the infrared energy radiating from the solar energy absorber. Only the bottom surface of the top plate, the surface closest to the solar energy absorber, is coated with the low emissivity material.

Both surfaces of the top plate are also preferably coated with an anti-reflective coating to reclaim reflective losses which are inherent in the use of a surface between the sun and an absorber. The anti-reflective coatings are selected to either have an index of refraction different from that of the surface on which they are used or to be colloidal in nature. If both a low emissivity coating and an anti-reflective coating are used on the same surface, they must be compatible with each other.

In a preferred embodiment, the solar energy collector also includes a light transmitting bottom plate intermediate to the solar energy absorber and the bottom of the light transmitting cells. If a bottom plate is used, only one of the four surfaces of the top and bottom plates need to be coated with a low emissivity material. It is preferred to coat the bottom surface of the bottom plate; i.e., the surface adjacent to the solar energy absorber, with the low emissivity material as opposed to coating the bottom surface of the top plate. It is understood, however, that the bottom surface of both plates may be coated if desired. The bottom plate may also have both surfaces coated with an anti-reflective material. Both the top plate and bottom plate may be coated with an anti-reflective material.

In a preferred embodiment, conduction losses are further controlled by evacuating the air within the light transmitting cells and/or replacing it with a fluid with a lower thermal conductivity. The fluid may be a liquid at ambient temperatures but must be a gas at temperature in excess of about 100° F. The fluid should also have a thermal conductivity below about 0.10 BTU inch/hour ft.$^2$ ° F.

DRAWING

These and other features, aspects and advantages of the present invention will become more apparent upon consideration of the following description, appended claims and accompanying drawings wherein:

DETAILED DESCRIPTION OF THE INVENTION

Figure 1:
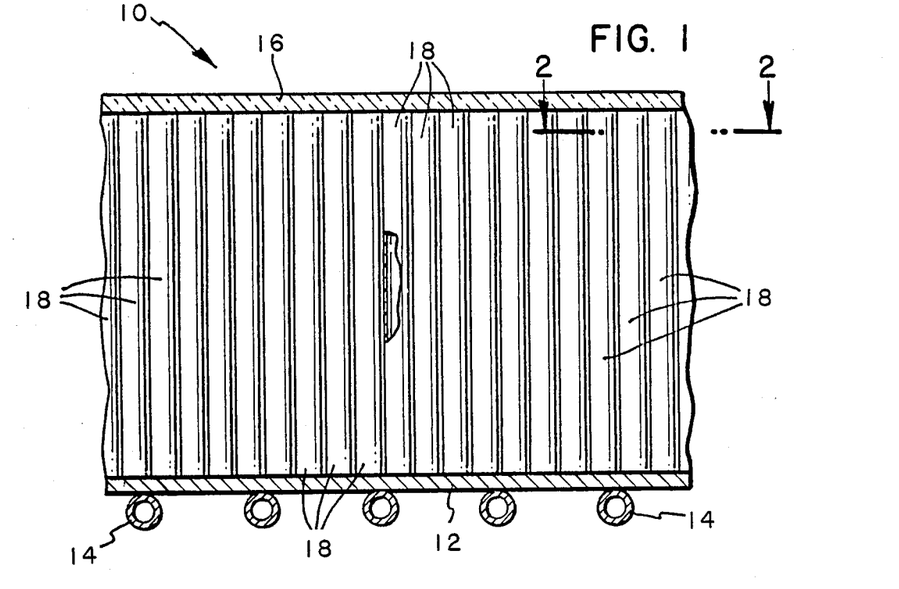
FIG. 1 is a side view of an embodiment of the solar collector of the present invention shown in conjunction with a flat plate solar collector.
Figure 2:
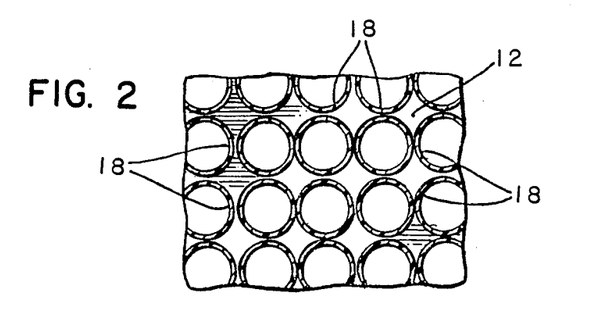
FIG. 2 is a partial view taken along the lines 2—2 of FIG. 1 showing one embodiment of the present invention.
Figure 3:
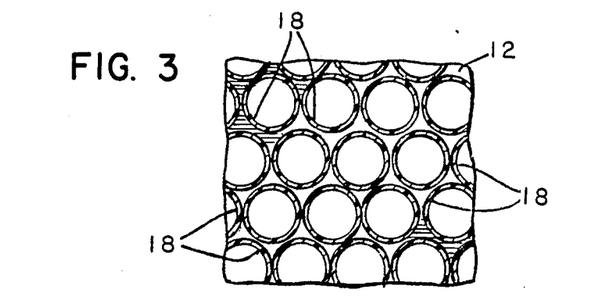
FIG. 3 is a partial view, also taken along the lines 2—2 of FIG. 1 showing another embodiment of the present invention.
Figure 7:
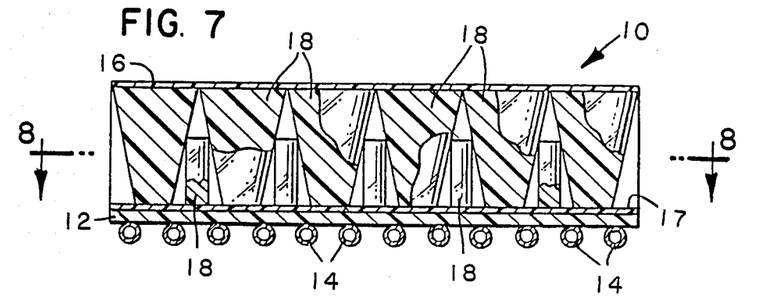
FIG. 7 is a side view of another embodiment of the present invention shown in conjunction with a flat plate solar collector.
Figure 8:
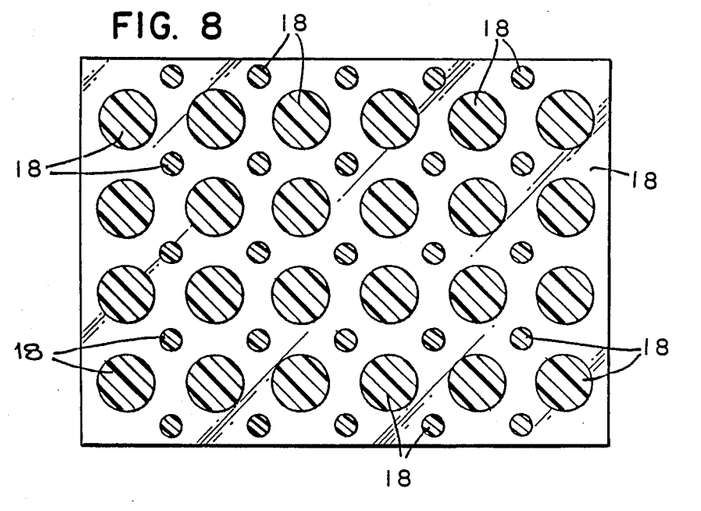
FIG. 8 is a partial view taken along the line 8—8 of FIG. 7.
Figure 9:
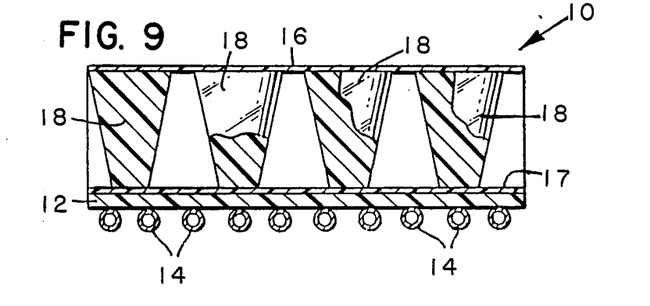
FIG. 9 is a side view of yet another embodiment of the present invention shown in conjunction with a flat plate solar collector.

Referring now to FIGS. 1, 7 and 9, the present invention will first be described in the environment of a flat plate solar collector 10 having a solar absorber 12 with two major surfaces, a series of fluid containing heat exchange tubes 14 adjacent one major surface of the solar absorber 12, side walls 11 and a top plate or cover 16. A bottom plate 17, shown only in FIGS. 7 and 9, adjacent the solar absorber, 12 may also be included. The solar absorber 12 is preferably optically black, coated with a black paint or electrolytic deposits of "black nickel" or chrome, to maximize energy absorption. The side walls are constructed of insulating material and the top plate 16 and bottom plate 17 are preferably constructed of glass, plastic or any other light transparent material.

An array of light transmitting cells 18 is positioned in the collector 10 in a plane perpendicular to the solar absorber 12.

The cells 18 are constructed from glass or transparent plastics, with a thermal conductivity of about 7 or less, preferably less than about 6, expressed as (BTU×inches) divided by (hour×feet²×degrees Fahrenheit). The glass should be clear and have a low iron content to minimize the absorption of sunlight. Soda-lime-silica glasses, borosilicate and lead glasses are examples of preferred materials with soda-lime-silicate and borosilicate glasses being the most preferred. The transmissivity in the solar spectrum of the glass used for the cells should be at least about 80 percent, preferably at least about 85 percent.

If plastics are used, they must have a transmissivity in the solar spectrum of at least 80 percent, preferably at least 85 percent. They should also be resistant to degradation caused by ultraviolet light and other elements encountered in the atmosphere and be able to maintain structural integrity at temperatures in excess of about 200° F. Examples of preferred plastics include polycarbonates, polystyrene, polyacrylate, polysulfone, polyarylate, fluroplastics, nylon, unfilled and glass reinforced polyesters, heat resistant polypropylene and polyetherimides.

The cells may be either cylinders, cones or truncated cones and they may be open at one or both ends or closed at one or both ends. Mixtures of these shapes may also be used. If cones or truncated cones are used, the large diameter should face the sun and the apex or small diameter should face the solar absorber 12. Cones and truncated cones are particularly advantageous because they present the smallest amount of reflecting edge surface per cell to the sunlight while still maintaining the desired convection control.

If mixtures of conical shaped cells (i.e., cones and truncated cones) and cylindrical cells are used, the ratio can be 80 percent conical shaped: 20 percent cylindrical to 20 percent conical shaped: 80 percent cylindrical. The conical shaped cells can be evenly dispersed among the cylindrical cells or clustered in the center of the array. If a low ratio of conical shaped cells to cylindrical cells is desired, it is preferred to cluster the conical shaped cells in the center of the array.

Some or all of the cells 18 may be connected to the top plate 16. Similarly, some or all of the cells 18 may be connected to the bottom plate 17. In a preferred embodiment, conically shaped cells are attached to the top plate 16 and cylindrical cells are attached to the bottom plate 17. The cylinders are ½ to ¾ the length of the conically shaped cells and extend into the voids between the conically shaped cells to prevent convection in these zones. The cylinders and conical shapes should be in close proximity but should not be touching. Close proximity will retard convection and the absence of contact between the cells will prevent conduction losses.

Cylindrical cells can have a diameter of from about 0.5 to about 1.5 inches; about 0.75 inches is preferred. Conically shaped cells can have an average diameter of from about 0.5 to about 2.5 inches; about 1.5 inches is preferred. The cells should have a wall thickness of from about 0.005 inches to about 0.05 inches. Wall thicknesses of less than about 0.005 inches have very little structural integrity and are difficult to work with. Thicknesses in excess of about 0.05 inches permit unacceptable conduction heat losses.

The length-to-diameter ratio of the cells should be above about 3, preferably from about 3 to about 12 and most preferably from about 3 to about 6. For conically shaped cells, the diameter for the foregoing ratio is determined at the midpoint in cell length. Length-to-diameter ratios within these ranges maximize control of convection heat loss by presenting the maximum amount of surface area and therefore surface friction to the potentially convecting gas. If the surface friction is higher than the bouyancy of the gas created by increases in temperature then the gas will be stagnant.

When truncated conical cells are used, the ratio of the large diameter to the small diameter is also important for control of convection heat losses. Preferably, the large diameter is from about 1.1 to about 3 times as large as the small diameter. Most preferably, the large diameter is about twice as large as the small diameter.

The cells 18 in the array may be in contact with each other or may be spaced apart. The latter is preferred because spaced apart cells have fewer reflecting surfaces and therefore reflect less sunlight from the solar absorber 12. Spaced apart cells also reduce conduction losses because there is less conducting material between the solar absorber 12 and the top plate 16. Spaced apart cells are also advantageous because fewer cells reduce the cost of the array.

The minimum spacing should be about 22 percent, preferably at least about 50 percent. That is, the volume between the cells should be at least about 22 percent of the volume within the cells. At 50 percent, the spacing is open enough to allow a significant increase in light flux to the solar energy absorber which, in turn, dramatically increases the maximum temperature attained by the absorber. Preferred maximum spacing for glass cells is about 125 percent; i.e., the volume between the cells should not exceed about 125 percent of the volume within the cells. For plastic arrays, the maximum spacing should not exceed about 200 percent. The variation in maximum spacing between glass and plastic cells is a function of the generally higher surface friction of plastics. As a result, plastic can sustain more open spacing and still control convection. This, in turn, allows more light flux to the solar absorber.

The cellular array 18 should also be spaced apart from the solar absorber 12 to prevent conduction between the absorber and the cells. Preferably, the cells 18 are positioned at the maximum distance from the absorber 12 which can be accommodated without the generation of convection. In this manner, convection is prevented and radiation heat transfer from the solar absorber to the cellular array is minimized, since it is inversely proportional to the distance of separation.

The top plate 16 and bottom plate 17 can be constructed of light transmitting glass or plastic and preferably are from about ⅛ to about ¼ inch thick. If a bottom plate is used, it should be spaced apart from the top of the solar absorber 12.

Preferably, the bottom surface of a plate is coated with a low emissivity material. If only a top plate is present in the system, the bottom surface of the top plate is coated. If both a top plate 16 and a bottom plate 17 are used, it is preferred that the bottom surface of the bottom plate 17 is coated with the low emissivity material instead of the bottom surface of the top plate 16. It is understood, however, that coating of both the top and bottom plates with a low emissivity material is within the scope of the present invention.

Examples of suitable heat mirrors include dielectric materials and multi-layer coatings. Preferred dielectric materials are metal oxides, used either alone or in conjunction with each other, such as indium oxide, antimony oxide, cadmium oxide, tungsten oxide, titanium dioxide, bismuth oxide, zinc oxide and tin oxide. The oxides may also be doped with small amounts; i.e., less than about 5 percent, of another material. Examples would include tin oxide doped with fluorine, indium oxide doped with chlorine and indium oxide doped with tin oxide. Doping widens the band gap of the coating and increases the effectiveness of the coating in transmitting incident sunlight. Doping also helps to block infrared radiated energy. Examples of metal oxides used in conjunction with other materials include silicon dioxide with silicon nitride and titanium dioxide with titanium nitride.

The multi-layer coatings contain a thin metal film between two dielectric layers. Examples of dielectric materials suitable for multi-layer coatings include tin oxide, titanium dioxide, indium oxide, bismuth oxide, zinc oxide and zirconium oxide. Examples of the metals include silver, gold, platinum, chromium, molybdenum, copper and aluminum.

The wide band gap dielectrics are preferred because they are more stable to high temperatures, humidity and atmospheric pollutants. An important factor in selecting a low emissivity coating is transmission of light. The average transmission through the solar spectrum of glass and plastic plates coated with a low emissivity material, 350 to 2,400 nanometers, should be above about 70 percent; preferably above about 75 percent. Similarly, the infrared reflection in the near infrared to far infrared region, 700 to 40,000 nanometers, should be above about 50 percent.

Both surfaces of the top plate 16 and bottom plate 17 are also preferably coated with an anti-reflective material to reclaim transmissivity losses which are inherent in the use of a surface between the solar absorber 12 and the sun.

The coatings are selected to either have an index of refraction different from that of the surface on which they are used; i.e., higher or lower, or to be colloidal in nature and both types are very thin. By thin is meant that the coating will not reflect incident sunlight on its own. Materials with a different index of refraction cause the reflected light to be re-reflected back onto the solar absorber. Colloidal materials increase the surface area or roughen the surface on which they are used on a microscopic scale. Reflection from these very small particles is in all directions instead of only away from the solar absorber. Thus, less of the light is reflected away from the solar absorber. Colloidal materials and different index of refraction materials can be used in combination with each other.

The coatings which operate on the basis of their index of refraction include both single layer and multi-layer types. Examples of the single layer types include magnesium fluoride, lithium fluoride, calcium fluoride, sodium aluminum fluoride (cryolite), sodium bromide, potassium bromide, zinc sulfide, zinc selenide and titanium dioxide. Examples of the multi-layer coatings include aluminum oxide with silicon dioxide, calcium silicate with magnesium fluoride, titanium dioxide with silicon dioxide, titanium dioxide with magnesium fluoride, zinc sulfide with magnesium fluoride and zinc sulfide with cryolite.

Suitable colloidal materials must be transparent. Examples include colloidal silica, colloidal alumina, colloidal silicates and colloidal organic materials.

The anti-reflective coating must, of course, be compatible with the low emissivity material when both are used together.

Convection losses within the cells 18 can also be controlled by partial evacuation of the air within the cells and/or by replacing the air with a fluid having a lower thermal conductivity. The preferred mechanism is to substitute a low thermal conductivity fluid.

The selected fluid may be a liquid at ambient temperature but it must be a gas at temperatures in excess of about 100° F. The fluid should also have a thermal conductivity below about 0.10 BTU inches/hour ft.$^2$ ° F.

Examples of suitable fluids include krypton, xenon, sulfur hexafluoride, $CCl_3F$, $CCl_2F_2$, $CHCl_2F$ and $CHClF_2$. Fluids which are not monoatomic and especially larger molecules are preferred. The fluids can be at atmospheric pressure or at pressures above or below atmospheric. With fluorine containing gasses, reduced pressure is preferred.

Figure 4:
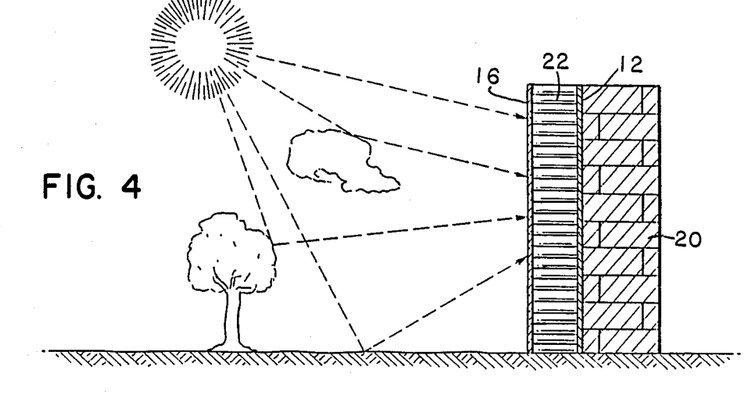
FIG. 4 is a side view of an embodiment of the solar collector of the present invention used in conjunction with the wall of a structure.
Figure 5:
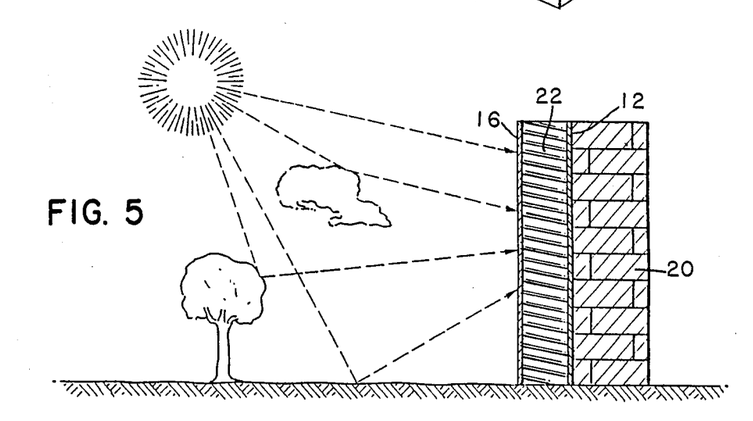
FIG. 5 is a side view of another embodiment of the solar collector of the present invention used in conjunction with the wall of a structure.

Referring now to FIGS. 4 and 5, the solar energy absorber can be all or part of an interior or exterior wall 20 and/or all or part of the roof of a structure such as a residential or commercial building. The wall or roof is preferably south facing in the northern hemisphere and north facing in the southern hemisphere to maximize exposure to solar radiation.

The wall or roof is constructed from a material with a high heat capacity and low thermal conductivity. The wall or roof is also, preferably, optically black, coated with a black paint or electrolytic deposits of "black nickel" or chrome to maximize absorbency of the sun's energy. A light transmitting cellular structure 22, identical to that described in detail above, is positioned immediately adjacent to the wall or roof. The cellular structure can be positioned perpendicular to the wall or roof or tilted at an angle approximating the average inclination of the sun in the sky.

Light from the sun would be converted into heat energy by the optically black solar energy absorber wall or roof. The heat energy would then be transmitted into the structure to heat the fluid; i.e., air, within the rooms of the structure.

Figure 6:
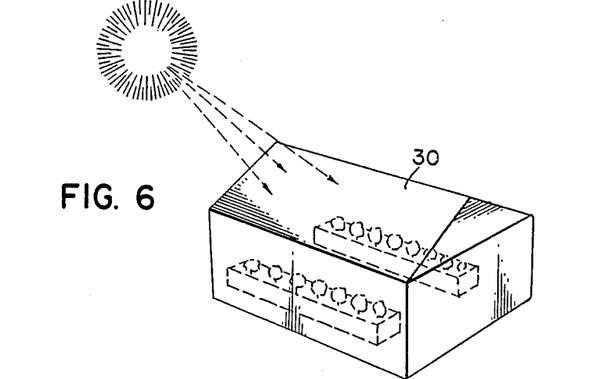
FIG. 6 is a side view of the solar collector of the present invention used in conjunction with a green house.

A third alternative of the present invention, shown in FIG. 6, uses the very contents of a room as the solar energy absorber. For example, in the environment of a green house, the plants and earth, etc. within the room function as the solar energy absorber. A light transmitting cellular structure 30, identical to that described in detail above, forms all or part of one or more walls and/or the roof of the green house. The light transmitting cellular structure reduces the amount of energy required to heat the green house and still allows sufficient light transmission for efficient plant growth.

As will be readily apparent to those skilled in the art, the various embodiments of the present invention may be combined to produce the most efficacious solar energy collector.

The following table of examples shows the high R-values attainable by the present invention.

TABLE I

| No. | Material[1] | Cell Dia. Inches | Cell Wall Inches | Cell Length Inches | Interstitial[2] Area Between Cells | Internal Gas | Coating[3] Performance % | R-Value |
|---|---|---|---|---|---|---|---|---|
| 1 | Glass | 0.50 | 0.005 | 2 | 22 | Xenon | 70 | 3.8 |
| 2 | Glass | 0.50 | 0.008 | 2 | 22 | Xenon | 90 | 5.0 |
| 3 | Glass | 0.50 | 0.005 | 2 | 22 | Xenon | 90 | 6.3 |
| 4 | Glass | 0.75 | 0.030 | 3 | 27 | Air | 75 | 2.6 |
| 5 | Glass | 0.75 | 0.030 | 3 | 22 | Xenon | 90 | 3.5 |
| 6 | Glass | 0.75 | 0.030 | 3 | 100 | Air | 75 | 3.0 |
| 7 | Glass | 0.75 | 0.030 | 3 | 100 | Xenon | 90 | 3.4 |
| 8 | Teflon | 0.50 | 0.015 | 2 | 22 | $CCl_2F$ | 70 | 4.0 |
| 9 | Teflon | 0.50 | 0.015 | 2 | 22 | Xenon | 70 | 4.2 |
| 10 | Teflon | 0.50 | 0.015 | 2 | 22 | Air | 75 | 3.3 |
| 11 | Teflon | 0.50 | 0.015 | 2 | 22 | Xenon | 75 | 4.1 |
| 12 | Teflon | 0.50 | 0.015 | 2 | 22 | $CCl_2F_2$ | 75 | 3.9 |
| 13 | Polystyrene | 0.50 | 0.030 | 2 | 22 | $CCl_2F_2$ | 70 | 3.8 |
| 14 | Polystyrene | 0.50 | 0.030 | 2 | 22 | $CCl_2F_2$ | 90 | 6.0 |
| 15 | Polycarbonate | 0.75 | 0.020 | 3 | 22 | Air | 62 | 3.4 |
| 16 | Polycarbonate | 0.75 | 0.020 | 3 | 22 | Air | 75 | 4.4 |
| 17 | Polycarbonate | 0.75 | 0.020 | 3 | 22 | $CCl_2F_2$ | 75 | 5.2 |
| 18 | Polycarbonate | 0.75 | 0.020 | 3 | 22 | Xenon | 90 | 8.9 |

[1]All glasses are soda-lime-silica types.
[2]Expressed as a % of internal cell area.
[3]Amount expressed as a % of re-radiated energy reflected back by coated top plate.

As this invention may be embodied in several forms without departing from the spirit or essential character thereof, the present embodiments are illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A solar energy collector comprising a housing defining an enclosed chamber, said housing comprising a solar energy absorber forming a bottom wall, a light transmitting top plate forming a top wall in a plane parallel to the solar energy absorber and spaced apart therefrom, vertically disposed side walls, and an array of light transmitting cells being situated intermediate to the top plate and solar energy absorber and arranged in a plane substantially perpendicular to the solar energy absorber, the cells being spaced apart from each other such that the volume between the cells is at least about 50 percent but not more than 200 percent of the volume within the cells, whereby substantial convection losses from the enclosed chamber are minimized.

2. A collector as defined in claim 1 wherein the shape of the cells is selected from the group consisting of cylinders, cones, truncated cones and mixtures thereof.

3. A collector as defined in claim 2 wherein the cells are open on at least one end.

4. A collector as defined in claim 1 wherein the cells have a length-to-diameter ratio of from about 3 to about 12.

5. A collector as defined in claim 1 wherein the cells are constructed of a material selected from the group consisting of light transmitting glasses and plastics having a thermal conductivity of 7 or less and a transmissivity in the solar spectrum of at least about 80 percent.

6. A collector as defined in claim 1 further comprising a bottom plate in a plane parallel to and spaced apart from the solar energy absorber, the bottom plate being adjacent to the bottom of the array of light transmitting cells.

7. A collector as defined in claim 6 wherein at least some of the cells are attached to the bottom plate.

8. A collector as defined in claim 6 wherein the bottom surface of the bottom plate is coated with a first coating of a low emissivity material.

9. A collector as defined in claim 8 wherein the low emissivity coating is selected from the group consisting of dielectric materials and multi-layer coatings.

10. A collector as defined in claim 8 wherein the surfaces of the top plate and the bottom plate are coated with a second coating of an anti-reflective material.

11. A collector as defined in claim 8 wherein the light transmission for the bottom plate coated with a low emissivity material is at least about 70 percent.

12. A collector as defined in claim 6 wherein the surfaces of the bottom plate are coated with an anti-reflective material.

13. A collector as defined in claim 12 wherein the anti-reflective material is selected from the group consisting of materials having a different index of refraction from that of the surface on which they are used and colloidal materials.

14. A collector as defined in claim 1 wherein at least some of the cells are attached to the top plate.

15. A collector as defined in claim 1 wherein the cells are constructed of glass and the volume between the cells is less than about 125 percent of the volume within the cells.

16. A collector as defined in claim 1 wherein the cells are constructed of plastic.

17. A collector as defined in claim 1 wherein the bottom surface of the top plate is coated with a low emissivity material.

18. A collector as defined in claim 17 wherein the light transmission for the top plate coated with a low emissivity material is at least about 70 percent.

19. A collector as defined in claim 1 wherein the cells are partially evacuated.

20. A collector as defined in claim 1 wherein the fluid within the cells comprises at least one fluid having a thermal conductivity below about 0.10 BTU inches/hour ft.$^{2\circ}$ F.

21. A collector as defined in claim 1 wherein the fluid within the cells comprises at least one fluid selected from the group consisting of krypton, xenon, sulfur hexafluoride, $CCl_3F$, $CCl_2F_2$, $CHCl_2F$ and $CHClF_2$.

22. A collector as defined in claim 1 wherein the surfaces of the top plate are coated with an anti-reflective material.

23. A collector as defined in claim 22 wherein the anti-reflective material is selected from the group consisting of materials having a different index of refraction from that of the surface on which they are used and colloidal materials.

24. A solar energy collector comprising a housing defining an enclosed chamber, said housing comprising a solar energy absorber forming a bottom wall, a light transmitting top plate forming a top wall in a plane parallel to the solar energy absorber and spaced apart therefrom, vertically disposed side walls, a light transmitting bottom plate in a plane parallel to the solar energy absorber and spaced apart therefrom and intermediate to the solar energy absorber and the top plate and an array of light transmitting cells being situated intermediate to the top plate and the bottom plate and arranged in a plane substantially perpendicular thereto whereby substantial convection losses from the enclosed chamber are minimized, and wherein the bottom surface of the bottom plate is coated with a first coating of a low emissivity material selected from the group consisting of dielectric materials and multilayer coatings and the surfaces of the top plate and the bottom plate are coated with a second coating of an anti-reflective material.

25. A collector as defined in claim 24 wherein the low emissivity coating is selected from the group consisting of indium oxide, antimony oxide, cadmium oxide, tungsten oxide, titanium dioxide, bismuth oxide, zinc oxide and tin oxide.

26. A collector as defined in claim 25 wherein the low emissivity coating is doped with less than about 5 percent of another material.

27. A collector as defined in claim 24 wherein the fluid within the cells comprises at least one fluid having a thermal conductivity below about 0.10 BTU inches/hour ft. $^{2\circ}$ F.

28. A collector as defined in claim 24 wherein the fluid within the cells comprises at least one fluid selected from the group consisting of krypton, xenon, sulfur hexafluoride, $CCl_3F$, $CCl_2F_2$, $CHCl_2F$ and $CHClF_2$.

29. A collector as defined in claim 24 wherein the shape of the cells is selected from the group consisting of cylinders, cones, truncated cones and mixtures thereof.

30. A collector as defined in claim 24 wherein the cells have a length-to-diameter ratio of from about 3 to about 12.

31. A collector as defined in claim 24 wherein the cells are constructed of a material selected from the group consisting of light transmitting glasses and plastics having a thermal conductivity of 7 or less and a transmissivity in the solar spectrum of at least about 80 percent.

32. A collector as defined in claim 24 wherein some of the cells are attached to the top plate.

33. A collector as defined in claim 24 wherein some of the cells are attached to the bottom plate.

34. A collector as defined in claim 24 wherein the cylindrical cells are $\frac{1}{2}$ to $\frac{3}{4}$ the length of the conically shaped cells.

35. A collector as defined in claim 24 wherein the conically shaped cells are truncated cones with a large diameter which is from about 1.1 to about 3 times as large as the small diameter.

36. A collector as defined in claim 24 wherein the cells are constructed of glass and the volume between the cells is less than about 125 percent of the volume within the cells.

37. A collector as defined in claim 24 wherein the cells are constructed of plastic and the volume between the cells is less than about 200 percent of the volume within the cells.

38. A collector as defined in claim 24 wherein the anti-reflective material is selected from the group consisting of materials having a different index of refraction from that of the surface on which they are used and colloidal materials.

39. A collector as defined in claim 24 wherein the cells are open on at least one end.

40. A collector as defined in claim 24 wherein the cells are at least partially evacuated.

41. A solar energy collector comprising a housing defining an enclosed chamber, said housing comprising a solar energy absorber forming a bottom wall, a light transmitting top plate forming a top wall in a plane parallel to the solar energy absorber and spaced apart therefrom vertically disposed side walls, and an array of light transmitting cells being situated intermediate to the top plate and the solar absorber and arranged in a plane substantially perpendicular thereto whereby substantial convection losses from the enclosed chamber are minimized, the bottom surface of the top plate being coated with a first coating of a low emissivity material selected from the group consisting of dielectric materials and multilayer coatings and the top and bottom surface of the top plate being coated with a second coating of an anti-reflective material.

42. A solar energy collector comprising a housing defining an enclosed chamber, said housing comprising a solar energy absorber forming a bottom wall, a light transmitting top plate forming a top wall in a plane parallel to the solar energy absorber and spaced apart therefrom, vertically disposed side walls, and an array of light transmitting cells being situated intermediate to the top plate and the solar absorber and arranged in a plane substantially perpendicular to the solar energy absorber, the cells being spaced apart from each other such that the volume between the cells is at least about 50 percent of the volume within the cells, wherein the shape of the cells is a mixture of cylinders, cones and truncated cones, the ratio of the conically shaped cells to the cylindrical cells is from 80:20 to 20:80 and whereby substantial convection losses from the enclosed chamber are minimized.

43. A collector as defined in claim 42 wherein the conically shaped cells are clustered in the center of the array.

44. A collector as defined in claim 42 wherein the conically shaped cells are evenly dispersed among the cylindrical cells.

45. A collector as defined in claim 42 wherein the cylindrical cells are $\frac{1}{2}$ to $\frac{3}{4}$ the length of the conically shaped cells.

46. A collector as defined in claim 42 further comprising a bottom plate in a plane parallel to and spaced apart from the solar energy absorber, the conically shaped cells being attached to the top plate and the cylindrical cells being attached to the bottom plate.

47. A solar energy collector comprising a housing defining an enclosed chamber, said housing comprising a solar energy absorber forming a bottom wall, a light transmitting top plate forming a top wall in a plane parallel to the solar energy absorber and spaced apart therefrom, vertically disposed side walls, and an array of light transmitting cells being situated intermediate to the top plate and the solar energy absorber and arranged in a plane substantially perpendicular to the solar energy absorber, the cells being spaced apart from each other such that the volume between the cells is at least about 50 percent of the volume within the cells, and the shape of the cells is selected from the group consisting of cylinders, cones, truncated cones having a large diameter which is from about 1.1 to about 3 times greater than the small diameter, and mixtures thereof, whereby substantial convection losses from the enclosed chamber are minimized.

48. A solar energy collector comprising a housing defining an enclosed chamber, said housing comprising a solar energy absorber forming a bottom wall, a light transmitting top plate forming a top wall in a plane parallel to the solar energy absorber and spaced apart therefrom, a light transmitting bottom plate in a plane parallel to the solar energy absorber and spaced apart therefrom and intermediate to the solar energy absorber and the top plate, vertically disposed side walls, and an array of light transmitting cells being situated intermediate to the top plate and the bottom plate and arranged in a plane substantially perpendicular thereto, the array comprising a mixture of conically shaped cells and cylindrical cells whereby substantial convection losses from the enclosed chamber are minimized, and the bottom surface of the bottom plate is coated with a low emissivity material selected from the group consisting of dielectric materials and multilayer coatings.

49. A collector as defined in claim 48 wherein the ratio of conically shaped cells to cylindrical cells is from 80:20 to 20:80.

50. A collector as defined in claim 4 wherein the conically shaped cells are clustered in the center of the array.

51. A collector as defined in claim 48 wherein the conically shaped cells are evenly dispersed among the cylindrical cells.

* * * * *